(12) United States Patent
Clark et al.

(10) Patent No.: US 6,266,703 B1
(45) Date of Patent: Jul. 24, 2001

(54) METHOD AND APPARATUS FOR PROVIDING CONFIRMATION NOTIFICATION FOR ISOCHRONOUS DATA

(75) Inventors: David K. Clark, Irving; Marvin L. Williams, Lewisville, both of TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 07/998,316

(22) Filed: Dec. 29, 1992

(51) Int. Cl.[7] ........................................... G06F 13/00
(52) U.S. Cl. ............................... 709/237; 709/231
(58) Field of Search .................. 395/800, 600, 395/325, 200; 364/514, 516; 358/400, 402, 403, 404; 379/93, 95, 100, 111, 143, 177, 188; 340/825, 825.06, 825.26, 825.27; 709/231, 237, 230

(56) References Cited

U.S. PATENT DOCUMENTS

| | | | |
|---|---|---|---|
| 5,017,917 | * 5/1991 | Fisher et al. | 340/825.79 |
| 5,138,653 | * 8/1992 | Le Clercq | 379/96 |
| 5,210,869 | * 5/1993 | Williams | 395/600 |
| 5,293,250 | * 3/1994 | Okumura et al. | 358/402 |
| 5,315,635 | * 5/1994 | Kane et al. | 379/57 |
| 5,325,310 | * 6/1994 | Johnson et al. | 364/518 |

\* cited by examiner

*Primary Examiner*—Larry D. Donaghue
(74) *Attorney, Agent, or Firm*—Bracewell & Patterson, L.L.P

(57) ABSTRACT

A method and apparatus for notifying an originator when a recipient has accessed an isochronous mail object for a specified duration of time. A Document Relational Service (DRS) is provided that allows the originator to specify relationships of distributions with isochronous objects and other objects. These relationships allow the originator to be notified on an expenditure of time basis when particular combinations of objects have been accessed. The Document Relational Service allows the user to specify time ranges for particular objects in varying combinations. A time service monitors the duration of access time spent on specified objects. Fulfillment of all combinations and time criteria generates the confirmation notice.

12 Claims, 9 Drawing Sheets

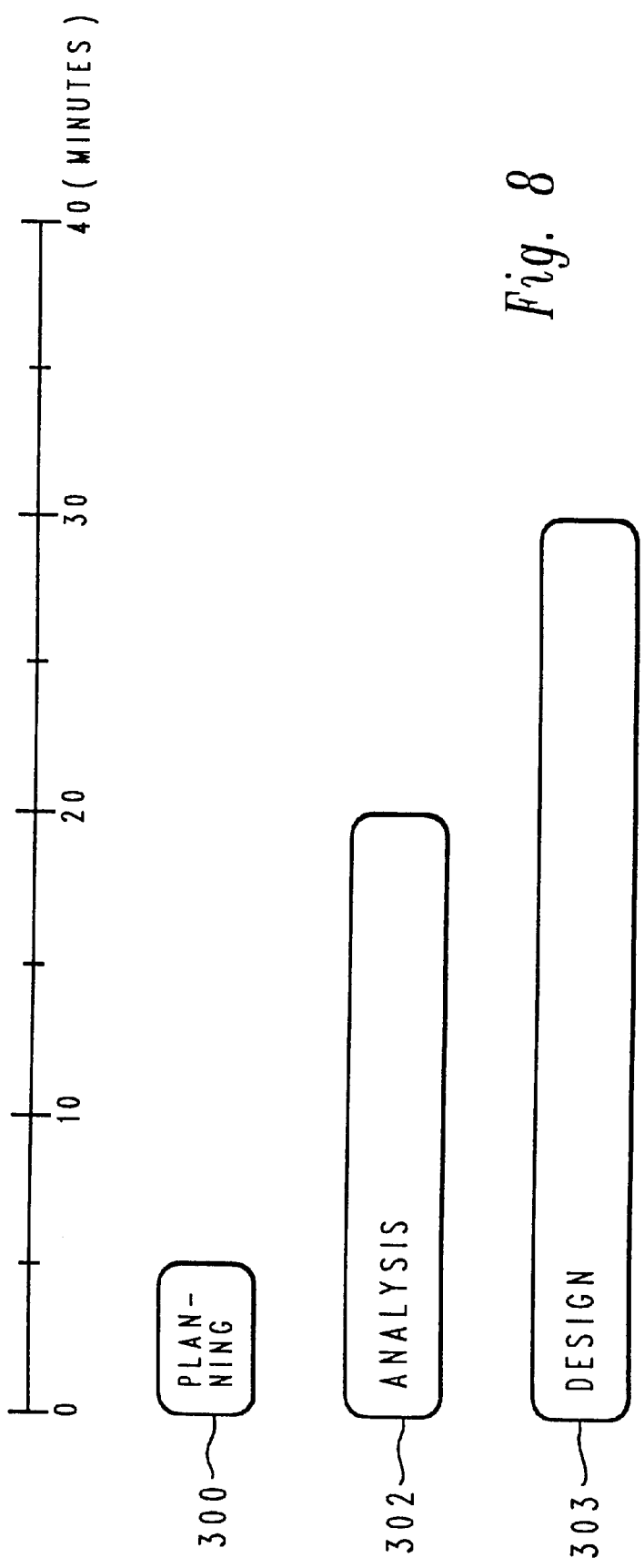

METHOD AND APPARATUS FOR PROVIDING CONFIRMATION NOTIFICATION FOR ISOCHRONOUS DATA

FIELD OF THE INVENTION

This invention relates to a data processing system, and more particularly, to confirmation of delivery notification to an originator of an isochronous object when a recipient has accessed the object.

BACKGROUND OF THE INVENTION

Confirmation of Delivery (COD) mechanisms provide notification capability so that an originator of an object is notified when particular actions are taken on the object by a recipient. Current mechanisms find extensive use in electronic mail interchanges where they are used to return a notification, if requested, to the originator of a mail message when the end user recipient has actually accessed the message in some way. The notification may be sent when the end user recipient opens, lists or deletes the message. Confirmation of delivery mechanisms have been extended to allow an originator to be notified when the end user recipient acts on a particular segment of a document (i.e., recipient has viewed page four) or triggered by an event.

In application, Ser. No. 07/513,651, filed Apr. 24, 1990, now abandoned, which is assigned to the assignee of the present application and incorporated herein by reference, an automated procedure is provided where a complex process comprising multiple data processing procedures may be initiated and run automatically in response to the occurrence of selected events or in response to a process detailed within a procedural abstract associated with the complex data processing procedure. A listed event may comprise the occurrence of an elapsed time, or the final event in a chain of events, all of which must occur prior to the activation of a specified data processing procedure. The foregoing solution is capable of handling non-isochronous text based messages delivered to a recipient, but is not capable of handling -mail transmissions containing a plurality of related isochronous objects (i.e., time dependent). As used in this specification, transmissions of isochronous data refer to transmissions of time-dependent data such as real-time video and digital voice. Originators of isochronous transmissions are more concerned with the amount of time a recipient has accessed a particular mail object. Current COD mechanisms cannot provide confirmation notices initiated by the duration of time a recipient has spent viewing or hearing (i.e., accessing) a particular mail object. Moreover, an isochronous object can be related to another object making it necessary to view several media presentations for the information to be accurately conveyed. Current mechanisms are incapable of allowing originators to receive notifications based on a total time for viewing related objects. For example, an originator may need to know when a recipient has spent a sufficient time in one object and sufficient time in a related object. After the recipient has spent a sufficient amount of time within the designated objects, then and only then, should the originator want a notification of confirmation.

Consequently, a technique is needed that provides a procedure for notifying an originator when a recipient has accessed isochronous objects a specified amount of time.

SUMMARY OF THE INVENTION

This invention relates to a method and apparatus for notifying an originator when a recipient has accessed an isochronous mail object for a specified duration of time. A Document Relational Service (DRS) is provided that allows the originator to specify relationships of distributions with isochronous objects and other objects. These relationships allow the originator to be notified on an expenditure of time basis when particular combinations of objects have been accessed. The Document Relational Service allows the user to specify time ranges for particular objects in varying combinations. Distribution and object identifiers correlate the relationships and generate confirmation notices. A user interface allows the user to establish relationships among existing or previously distributed objects. The completion criteria for generating a confirmation is a completion set, i.e., the set of all events that must be fulfilled. When all events have a completion state, the threshold for confirmation is met for the completion set. Thus, an originator can define completion sets and how long a completion set should be enabled. A time service monitor registers the duration of access time spent on specified objects. The manipulation of particular objects for a specified duration of time creates a completed element of the set. Fulfillment of all combinations and time criteria generates the confirmation notice.

BRIEF DESCRIPTION OF THE DRAWINGS

FIG. 8 is a pictorial representation of isochronous documents of varying access times that may be tracked by the present invention.

DETAILED DESCRIPTION

Figure 1:
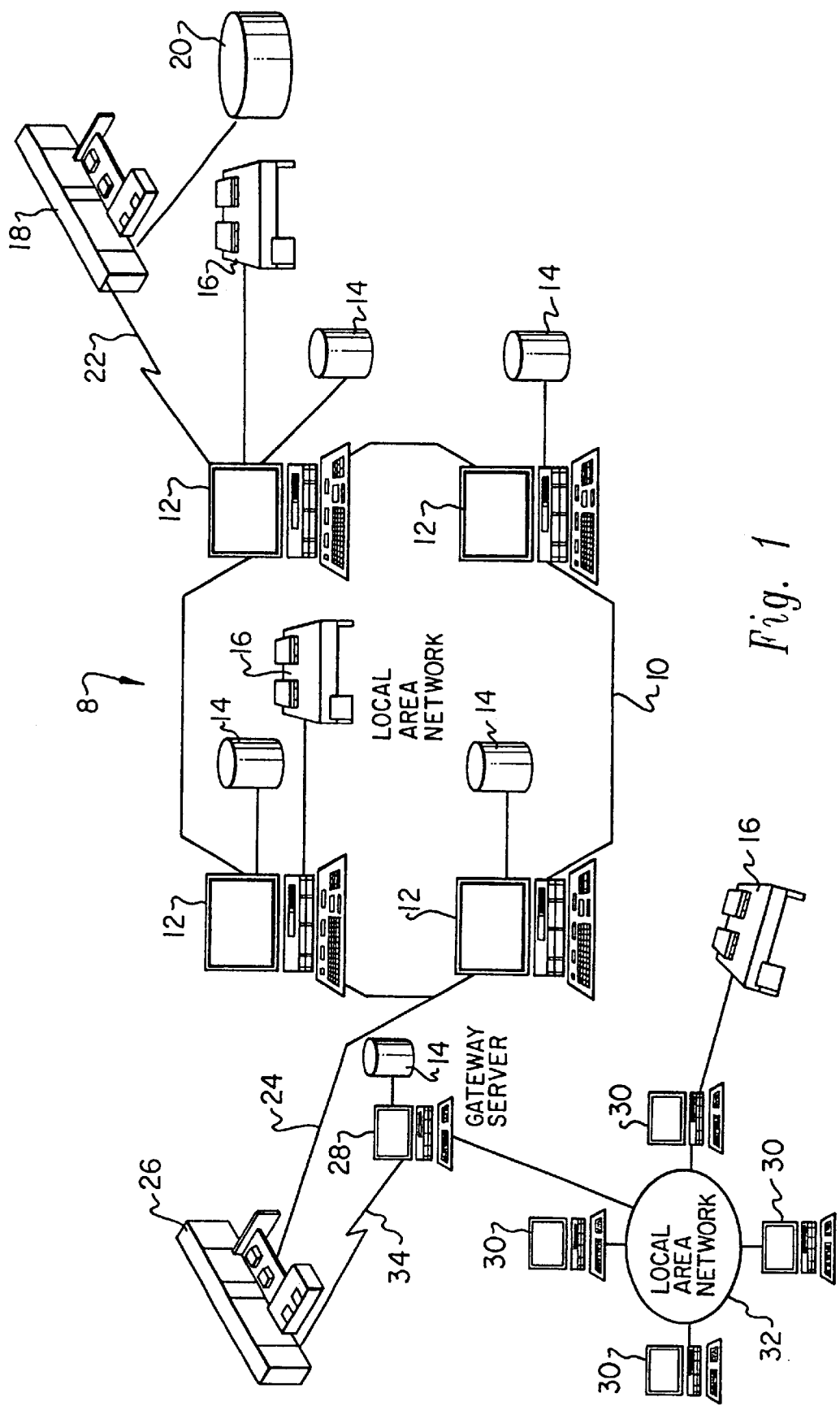
FIG. 1 is a pictorial representation of a data processing system where this invention may be practiced.

With reference now to the figures, and in particular FIG. 1, there is depicted a pictorial representation of data processing system 8 which may be utilized to implement the method of the present invention. As may be seen, data processing system 8 may include a plurality of networks, such as Local Area Networks (LAN) 10 and 32, each of which preferably includes a plurality of individual computers 12 and 30, respectively. of course, those skilled in the art will appreciate that a plurality of Interactive Work Stations (IWS) coupled to a host processor may be utilized for each such network.

As is common in such data processing systems, each individual computer may be coupled to a storage device 14 and/or a printer/output device 16. One or more such storage devices 14 may be utilized, in accordance with the method of the present invention, to store applications or resource objects which may be periodically accessed by any user within data processing system 8. In a manner well known in the prior art, each such application or resource object stored within a storage device 14 is associated with a Resource Manager, which is responsible for maintaining and updating all resource objects associated therewith.

Still referring to FIG. 1, it may be seen that data processing network 8 may also include multiple main frame computers, such as main frame computer 18, which may be preferably coupled to Local Area Network (LAN) 10 by means of communications link 22. Main frame computer 18 may also be coupled to a storage device 20 which may serve as remote storage for Local Area Network 10. Similarly, Local Area Network (LAN) 10 may be coupled via communications link 24 through a subsystem control unit/communications controller 26 and communications line 34 to a gateway server 28. Gateway server 28 is preferably an individual computer or Interactive Work Stations (IWS) which serves to link Local Area Network (LAN) 32 to Local Area Network (LAN) 10.

As discussed above with respect to Local Area Network (LAN) 32 and Local Area Network (LAN) 10, resource objects may be stored within storage device 20 and controlled by main frame computer 18, as resource manager for the resource objects thus stored. Of course, those skilled in the art will appreciate that main frame computer 18 may be located a great geographic distance from Local Area Network (LAN) 10 and similarly Local Area Network (LAN) 10 may be located a substantial distance from Local Area Network (LAN) 32. That is, Local Area Network (LAN) 32 may be located in California while Local Area Network (LAN) 10 may be located within Texas and main frame computer 18 may be located in New York.

Figure 2A:
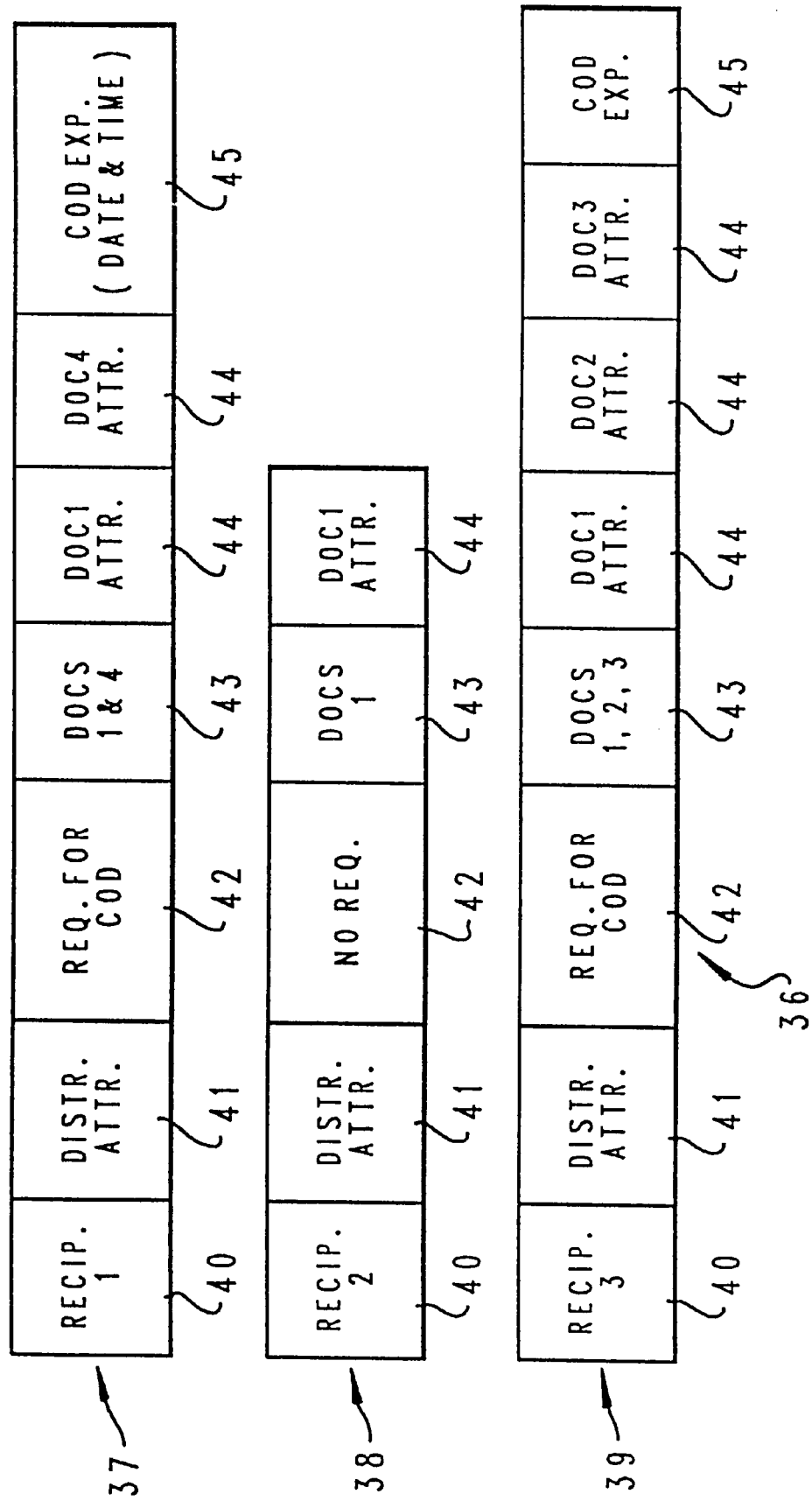
FIGS. 2A and 2B show a procedural abstract for specifying isochronous objects constructed in accordance with the method of the present invention.

Turning now to FIG. 2A, there is shown a simple procedural abstract 36 for specifying isochronous objects constructed in accordance with the method of the present invention for inputting completion set data. As illustrated, three records 37, 38 and 39 have been created by an originator. Each record contains isochronous objects that will be sent to three recipients. Record 37 contains a recipient 40 field (for identifying the intended recipient), a distribution attribute 41 (for properties/characteristics of the distribution), a request for confirmation of delivery 42 (based on the time spent within an object), a list of documents in the distribution 43, document attributes 44 (for each of the documents in the distribution) and confirmation of delivery expiration 45 (for date and time of COD expiration). Records 38 and 39 follow the simple procedural abstract of record 37 allowing an originator to flexibly enter completion set data for each recipient. One skilled in the art recognizes that a COD may be sent back to an originator of an object using the originator's address that is attached to the originally transmitted object.

Figure 2B:
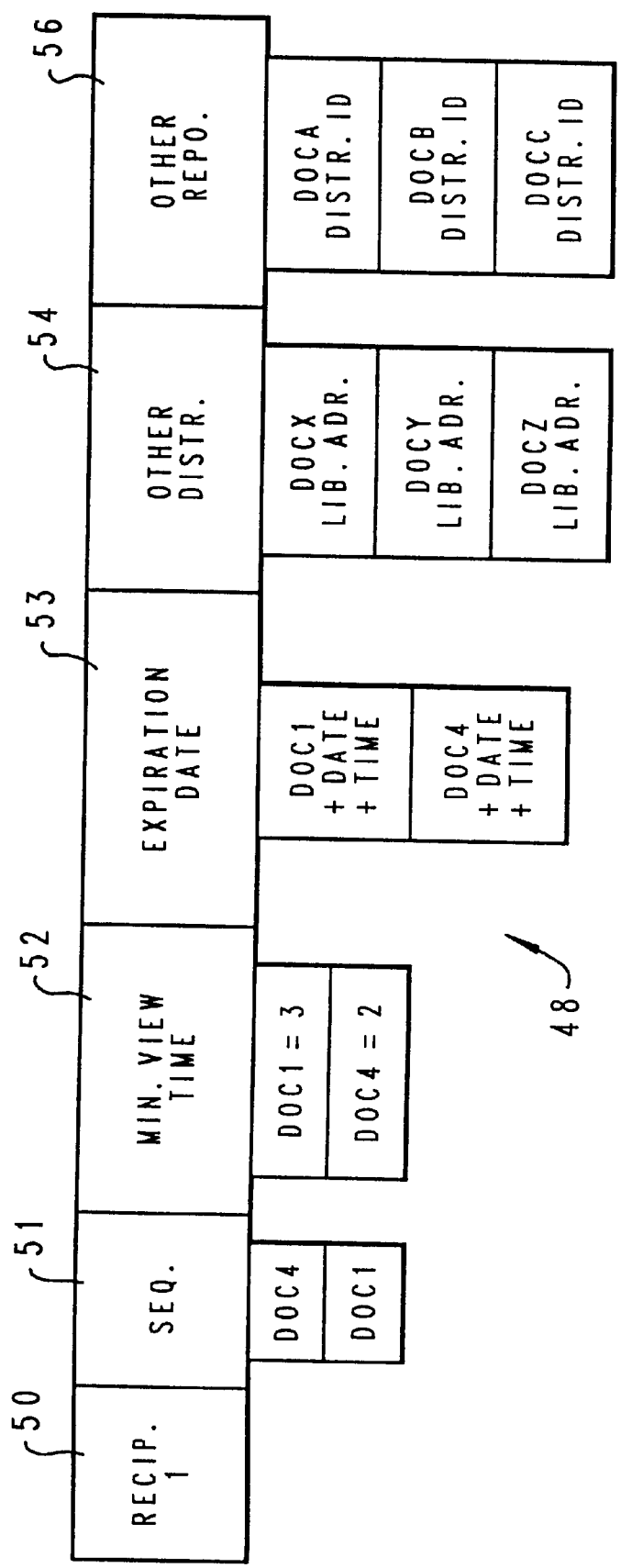

Referring now to FIG. 2B, the records 36 created for the completion set as described in FIG. 2A, are inputted to a document relational service which allows entry of the data parameters shown in FIG. 2B. Record 48 is a confirmational relationship identifier which contains the following fields. For each recipient 50, the originator must enter the sequence 51 (for indicating the order of each document presented to a recipient), a minimum view time 52 (for indicating the duration of time each document is to be accessed), an expiration date 53 (for indicating the date and time the confirmation request will expire), an other distribution 54 (for indicating the library addresses of documents in the distributions) and an other repositories 56 indicator (for indicating documents transmitted in earlier transmission).

Those skilled in the art will appreciate that the data within the above procedural abstracts must be identified in a consistent manner in order to permit operation of the invention. This may be accomplished in any way known to those skilled in the art; however, the Document Interchange Architecture (DIA) used in many International Business Machines Corporation office products has architected a method by which documents/objects are identified uniquely within a network by a Library Assigned Document Name (LADN). The utilization of a LADN to uniquely identify the above documents will allow a group of users to freely exchange documents within a network.

Figure 3:
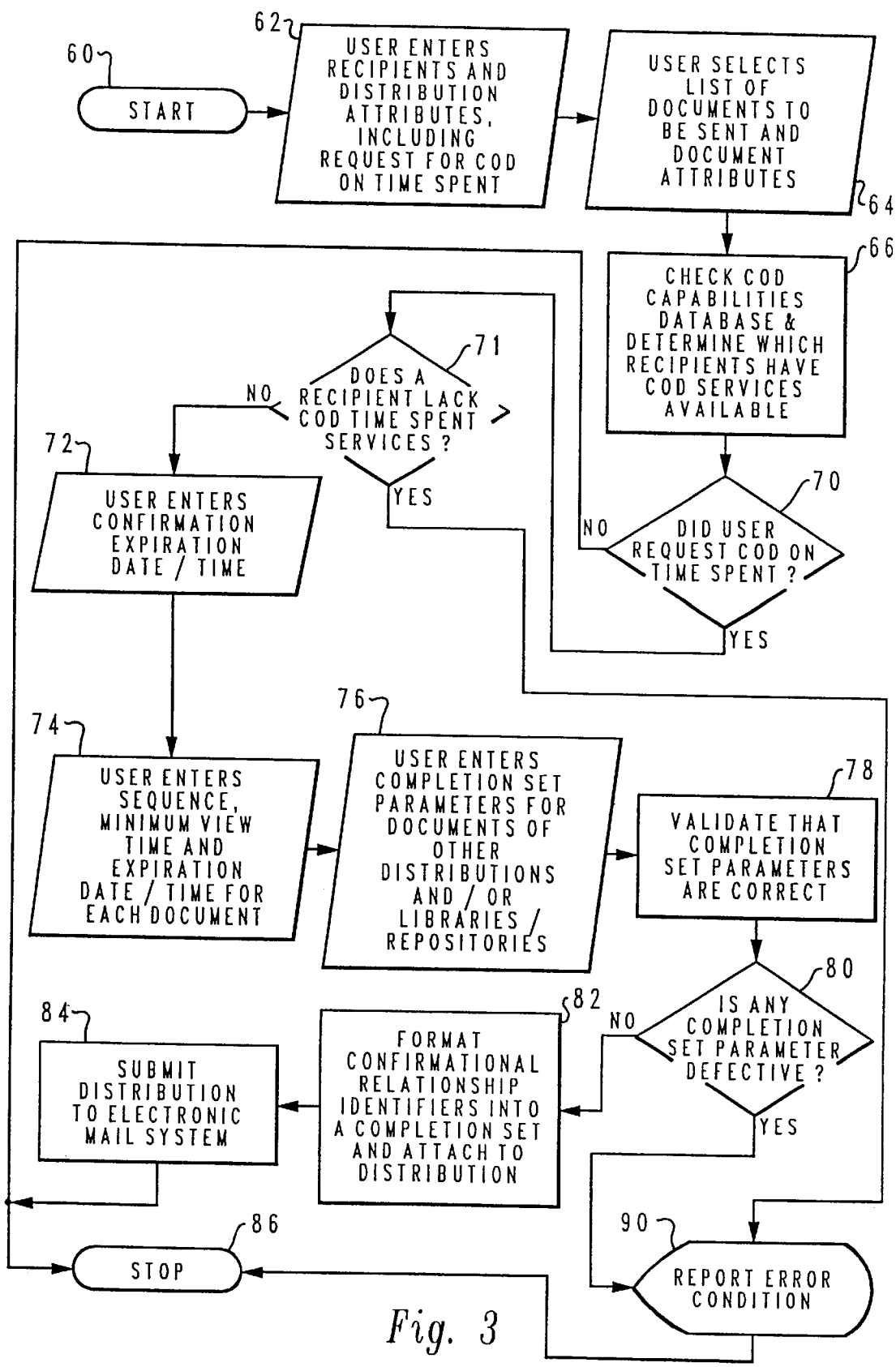
FIG. 3 shows a flow diagram of a procedure for creating a completion set request using the present invention.

Turning now to FIG. 3, a flow diagram is shown for creating a completion set by an initiator/originator. The procedure begins at block 60 and moves to block 62 where the originator enters the recipients and distribution attributes, including a request for COD on time spent viewing or listening to (i.e., accessing) isochronous objects. The originator selects the list of documents to be sent and the document attributes at block 64. At block 66, the procedure examines the COD data base to ascertain if confirmation of delivery capabilities are available for each recipient entered by the originator. At block 70, the procedure checks to determine if the user requested COD on time spent within an object. If NO, the procedure ends at block 86. Else, a check is conducted at block 71 to determine if any of the recipients lack COD services for time spent within an object. If NO, the originator enters confirmation expiration date/time for time spent within an object, at block 72. If YES, the procedure reports the error condition at block 90 and ends at block 86.

The document relational service (DRS) begins at block 74 where the originator enters sequence, minimum view time, and expiration date/time for each object in a distribution (completion set). The DRS is used to create confirmational relational identifiers. These identifiers signify which documents must be accessed for a confirmation of delivery notice to be generated. The user may specify that documents must be accessed in a specified order to generate the confirmation notice. At block 76, the originator enters the completion set parameters for objects of other distributions and/or libraries/repositories. The procedure validates the completion set parameters, at block 78, to insure they are correct. At block 80, the procedure checks if any completion set parameters are defective. If NO, at block 82, the confirmational relationship identifiers are formatted into a completion set request which is then attached to the distribution. At block 84, the distribution is submitted to the electronic mail system for delivery to the recipient and the procedure ends at block 86. Returning to block 80, if the completion set parameters are defective, the error condition is reported at block 90 and the procedure ends at block 86.

Figure 4:
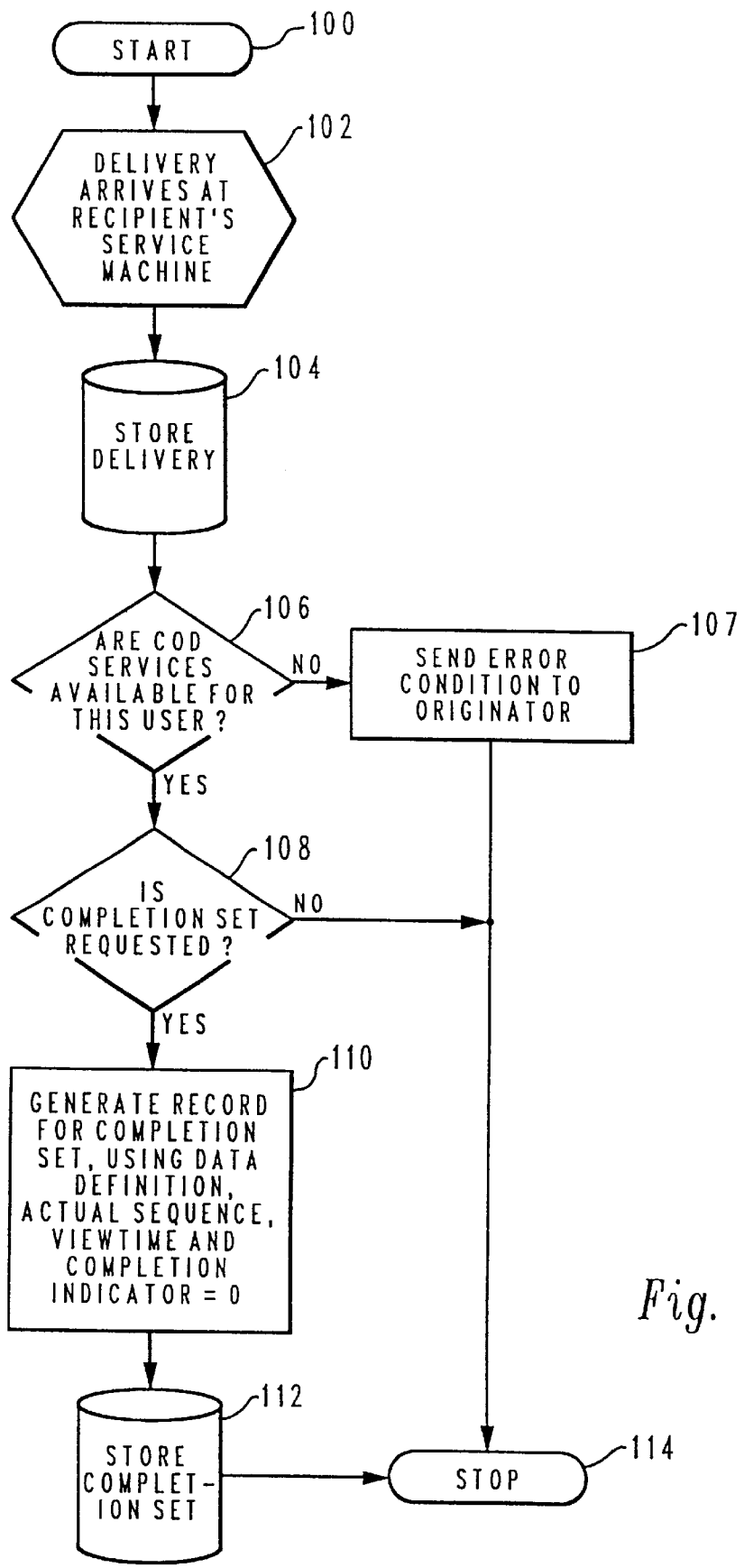
FIG. 4 shows a flow diagram of a procedure for receiving a completion set request at a recipient's machine using the present invention.

Turning now to FIG. 4, initialization of a completion set at the recipient's machine is described. One skilled in the art recognizes that the term machine refers to a service, e.g., library service, mail service, etc., which may include hardware and software to act on a user's behalf. The procedure starts at block 100 and proceeds to block 102 where an isochronous transmission arrives at the recipient's machine. At block 104, the delivery is stored at the recipient's machine. The procedure checks at block 106 to see if confirmation of delivery services are available for the user. If YES, a check is made to see if a completion set was requested at block 108. If YES, at block 110, the procedure generates a record for the completion set using the data definition. The actual sequence, view time and the complete indicator are also set to zero and the completion set record is stored at block 112. Returning to block 106, if COD services are not available for an intended recipient, an error condition is sent, at block 107, to the originator and the procedure ends at block 114. At block 108, if a completion set is not requested the procedure ends at block 114.

Figure 5:
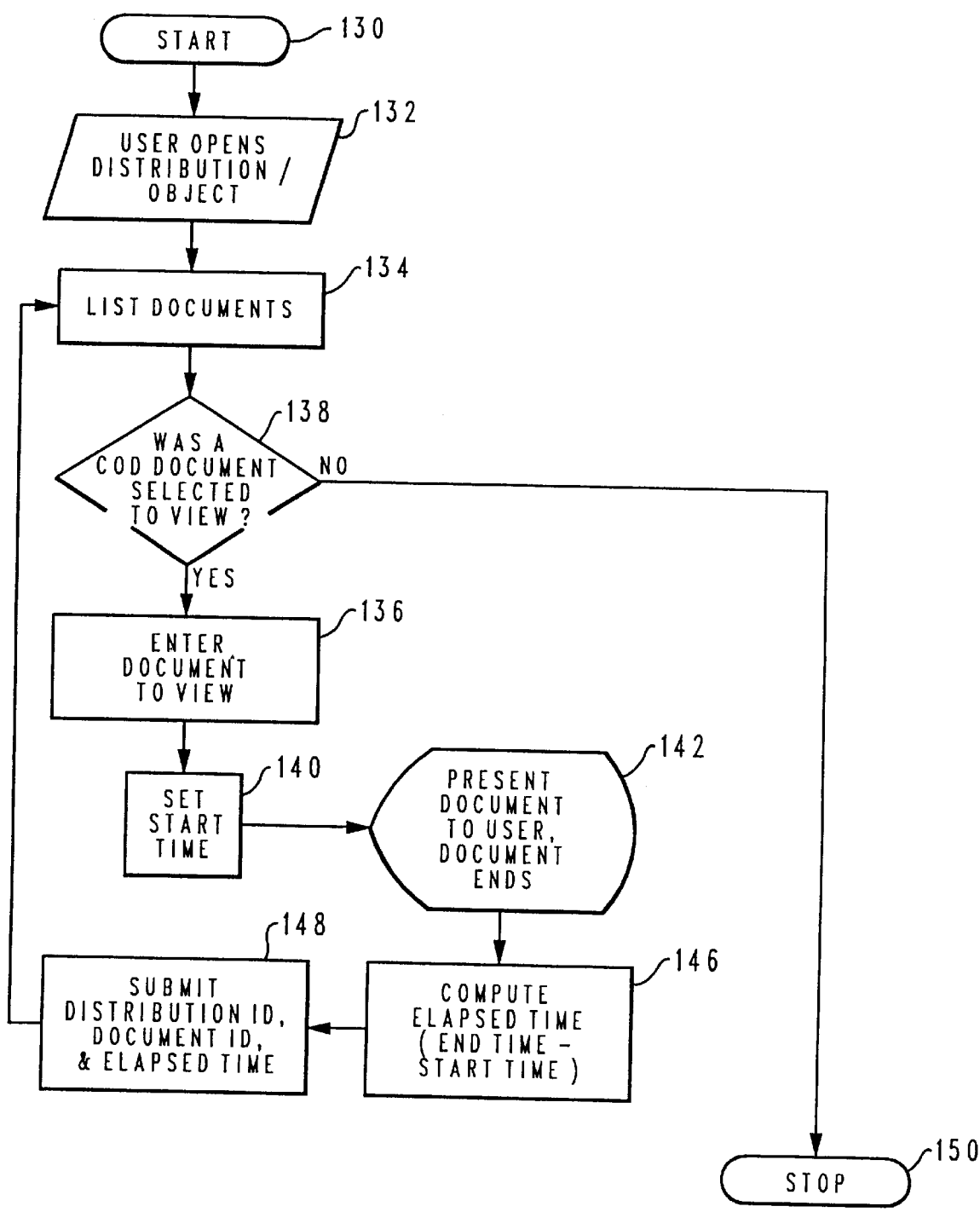
FIG. 5 describes the reception of a distribution at a recipient's machine and the subsequent accessing of isochronous objects contained therein.

Turning now to FIG. 5, a flow diagram is shown for operation of the invention when the recipient accesses the isochronous objects. The procedure starts at block 132 where the distribution is opened. The objects are listed at block 134 and the recipient is allowed to enter the object to view. At block 138, the procedure checks to see if an object is selected for viewing and queues the object for viewing at block 136. At block 140, the procedure sets a start time for viewing the object which is presented to the user at block 142. At block 146, the procedure computes the elapsed time for the operation. Control then moves to block 148 where the procedure submits the distribution identifier (ID), document ID and elapsed time for the access to the time service monitor. The procedure then returns to block 134 to list the next document in the distribution and the procedure is repeated until all documents have been accessed.

Figure 6:
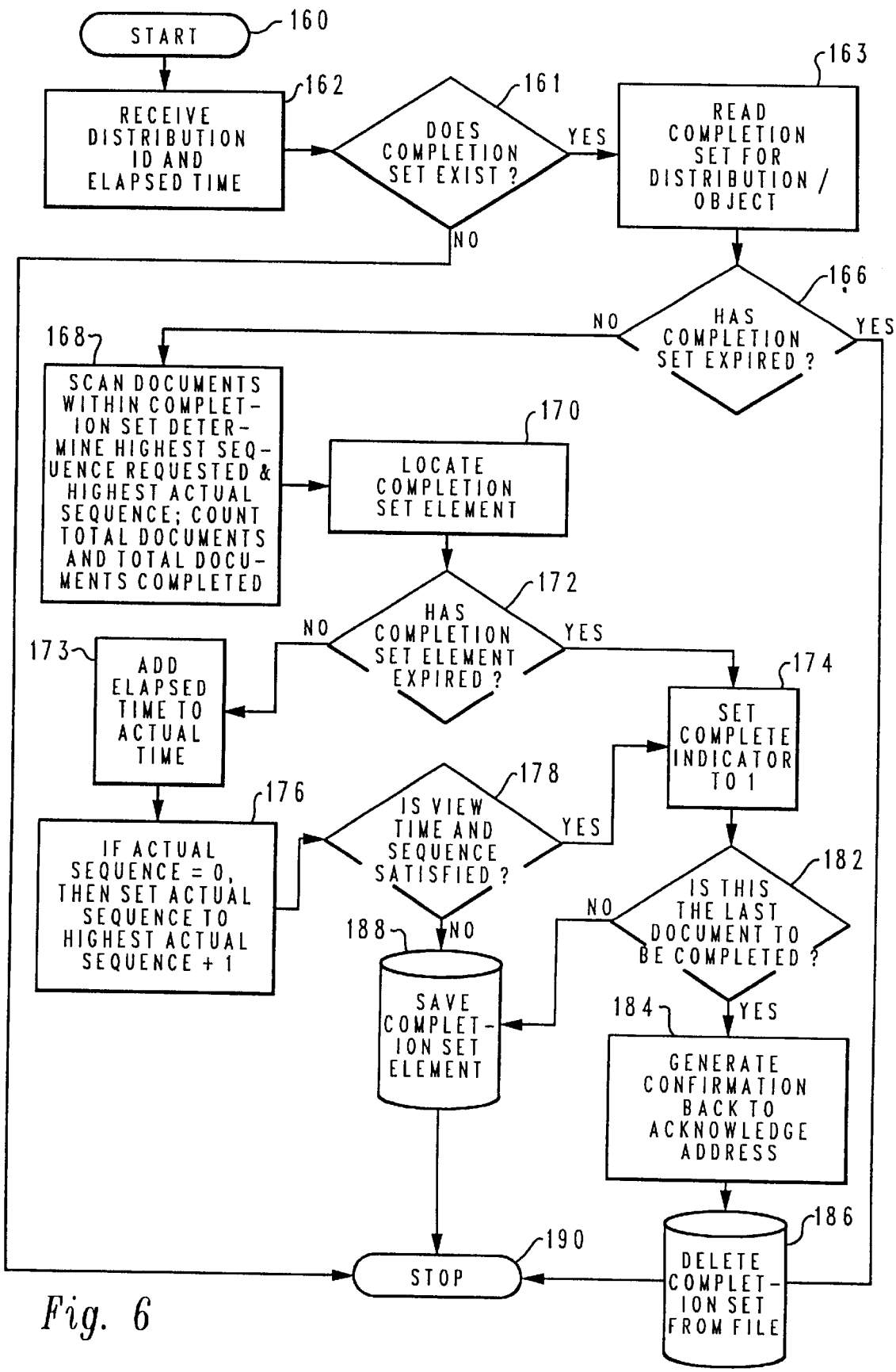
FIG. 6 shows a flow diagram of a time service monitor for tracking access of isochronous objects.

With reference now to FIG. 6, a flow diagram is shown for a time service monitor. The procedure begins at block 162 where the distribution ID, the document ID, and the elapsed time is received. Control then passes to block 161 where the procedure checks to see if a completion set exists. If NO, the procedure ends at block 190. If YES, at block 163, the completion set is read for the distribution. At block 166, the procedure checks to see if the completion set has expired. If YES, the procedure deletes the completion set, at block 186, and the procedure ends at block 190. Else, the objects within the completion set are scanned, at block 168, to determine the highest sequence requested and the highest actual sequence. A total count is made of the objects within the completion set and the total documents completed. At block 170, the completion set element for the document ID is located. The procedure then checks to see if the completion set element for the document has expired at block 172. If NO, the elapsed time is added to the actual view time at block 173. This is done to accumulate a total viewed/access time for the document. At block 176, if the actual sequence is zero, then the actual sequence is set to the highest actual sequence plus one. This covers conditions when a document has never been accessed. At block 178, the procedure checks to determine if the view time and sequence has been satisfied. If YES, at block 174, the complete indicator is set to one. The procedure then checks to see if the last document has been completed at block 182. If YES, a confirmation is generated and transmitted back to the acknowledgement address at block 184. The completion set is deleted from the file at block 186 and the procedure ends at block 190.

Figure 7:
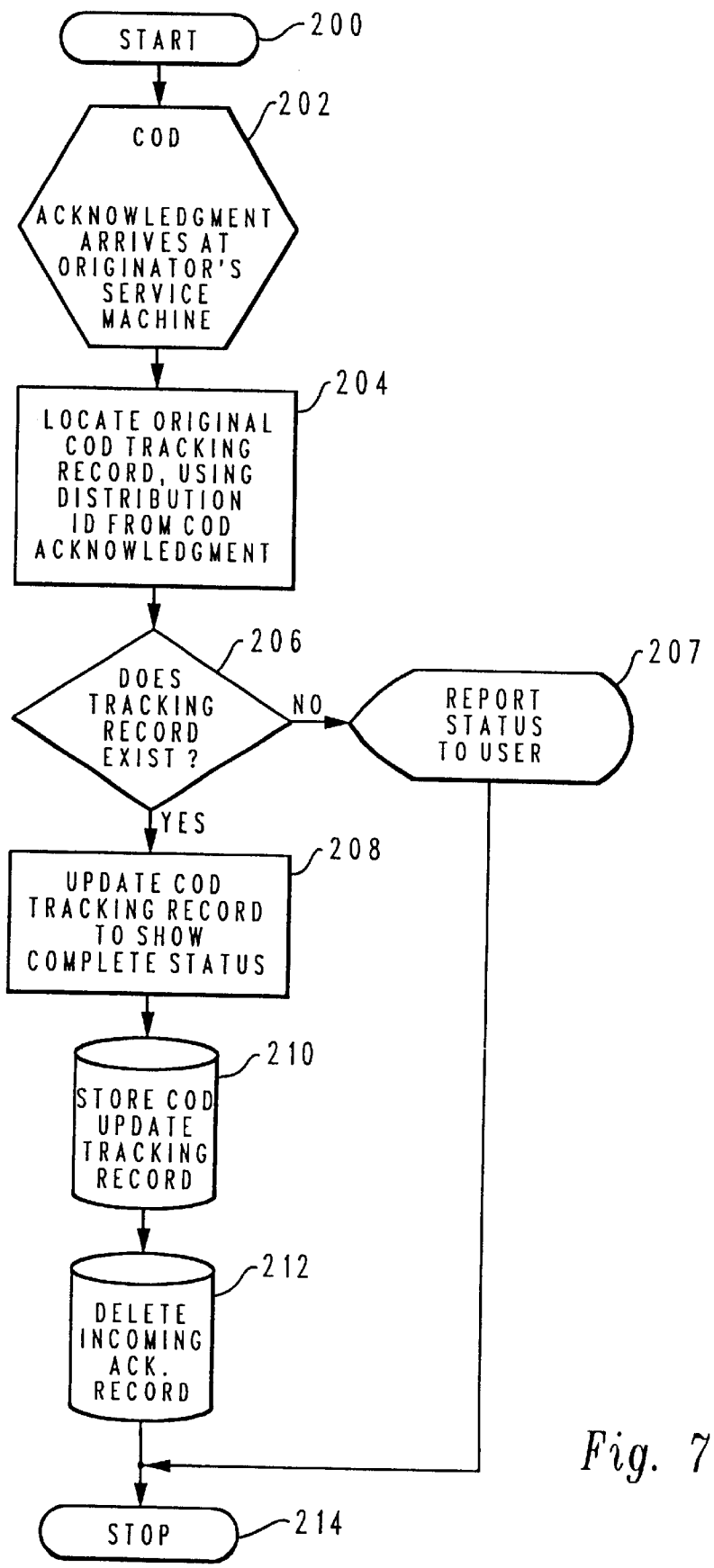
FIG. 7 shows a flow diagram of a procedure for receiving a confirmation message generated by the present invention at the originator's machine.

Turning now to FIG. 7, a flow diagram is shown for receiving a COD notification at the originator's machine using the present invention. The procedure starts at block 200 and proceeds to block 202 where the confirmation of delivery acknowledgement arrives at the originator's machine. At block 204, the original confirmation tracking record for the delivery request is located using the distribution ID. At block 206, the machine checks to see if a tracking record exists. If NO, at block 207, the status is reported to the user. If YES, the recipient's machine proceeds by updating the COD tracking record to show "complete" status as shown at block 208. At block 210, the updated COD tracking record is stored and the procedure proceeds to delete all incoming COD acknowledgement records for the distribution as indicated at block 212.

The notification capability of the present invention can best be understood by taking a specific example through the logic of FIGS. 3–8. With reference to FIG. 8, there is depicted a pictorial representation of three isochronous documents which an originator wishes to send to a recipient to be viewed for a predetermined amount of time. The planning document 300 will be displayed for 5 minutes, the analysis document 302 for 20 minutes and the design document 303 for 30 minutes. Total viewing time for the combination of the planning 300 document, analysis document 302 and design documents 303 equals 55 minutes. With particular reference to FIG. 3, the originator first enters the intended recipients as shown in block 62. In addition, a distribution attribute and a request for COD notification based on the time spent viewing the documents (55 minutes total) are specified. As indicated at block 64, the originator enters the list of documents (i.e., planning 300, analysis 302, and design 303) to be sent along with the documents' attributes. This causes the procedure to check the intended recipients' machines to determine if confirmation of delivery capabilities are available as indicated at block 66. If the users have the capability, the procedure proceeds to block 70 to determine if the user requested COD based on time spent within objects. If the users have COD services, at block 72, the originator enters the confirmation's expiration date and time. Control then passes to the document relational service which provides for the entry of sequence, minimum view time, and expiration date time for each document as shown in block 74. One skilled in the art recognizes that the originator may input the total viewing times for each document (i.e., planning =5 minutes, analysis =20 minutes; design =30 minutes) or a time less than the total for each of the documents. At block 76, the originator enters the completion set parameters for documents in other distributions and or libraries/repositories. If, for example, planning document 300 had been distributed in an earlier distribution, the user may appropriately indicate it. After all the required entries are made, the procedure checks at block 78 to insure all the parameters are correct. If all of the entries are correct, the procedure continues to block 82 where a completion set request is generated and attached to the distribution. At block 84, the distribution is submitted to the electronic mail system and sent to the recipients' machine.

Upon arrival at the recipients' machines, as shown in FIG. 4, block 102, the distribution is stored as indicated in block 104. The procedure interrogates the recipients' machines to ensure confirmation services are available at block 106. In addition, the procedure checks to see if the originator has requested a completion set as shown at block 108. If YES, the recipients' machines generates a record for the completion set and the procedure initializes the recipients' machines by setting to zero the actual sequence, view time and complete indicator as shown in block 110. The recipients' machines then store the completion set record as indicated at block 112. Control is then transferred to the time service monitor for registering the duration of access time spent in each of the objects (i.e., planning 300, analysis 302, and design 303) as they are accessed/viewed by the recipients.

Turning now to FIG. 5, the distribution is opened by the recipients at block 132 and the documents therein are listed at block 134. The procedure checks at block 138 to see if a COD document is selected for viewing. If YES, the recipients are allowed to enter a document for viewing at block 136. The procedure sets the start time at block 140 and presents the document to the recipients at block 142. The procedure monitors continuously the time spent within the document and marks when access is ended. At block 146, the procedure computes the elapsed time spent within the document by subtracting the start time from the end time. At block 148, the distribution ID, document ID and elapsed time are submitted to the time service monitor and the procedure returns to block 134 for processing additional documents within the distribution.

Turning now to FIG. 6, the time service monitor receives the distribution ID, document ID, and elapsed time information for the each of the documents at block 162. At block 161, the procedure checks to see if a completion set exists. If YES, the procedure reads the completion set record for the distribution at block 163. A check is then done to see if the completion set has expired at block 166. If NO, at block 168, the completion set is scanned to determine the highest sequence requested and the actual sequence length for each of the documents. The procedure tracks the total documents and the total number of documents viewed by the recipient. The procedure locates the completion set element for each document ID at block 170 and determines if the completion set element has expired for a given document as shown in block 172. If NO, at block 173, the elapsed time for viewing by the recipient is added to the actual view time. At block 176, if the actual sequence is zero, then the actual sequence is set to the highest actual sequence plus one. Control is then transferred to block 178 where a check is made to determine if the view time and sequence has been satisfied. If YES, at block 174, the complete indicator is set to one and the procedure checks to see if all documents are completed at block 182. If YES, a confirmation is generated at block 184 and the completion set is deleted for the distribution at block 186. If NO, at block 188, the completion set element is saved. This permits a recipient to view less than all of the documents while the system maintains track of what the recipient has viewed. After all the documents in the distribution have been viewed and the confirmation sent, control then returns to the originator's machine for receiving the confirmation as shown in FIG. 7, block 202.

With particular reference to FIG. 7, when the confirmation acknowledgment arrives at the originator's machine, the original confirmation tracking record is located using the distribution ID from the confirmation acknowledgment at block 204. The procedure checks to see if the tracking record exists at block 206, and if YES, updates the tracking record to show "complete" status at block 208. The tracking record is then stored at block 210 and the incoming confirmation acknowledgment record is deleted at block 212.

In summary, the invention provides a method and apparatus for notifying an originator of an isochronous transmission when the recipient has accessed a particular object for a specified duration of time. The mechanism of the present invention may be triggered by detecting accesses resulting from any process by which a confirmation notice may be initiated such as a file access, printing, viewing or listening to an object. While the invention has been particularly shown and described with reference to preferred embodiments thereof, it will be understood by those skilled in the art that various changes in form and details may be made therein without departing from the spirit and scope of the invention. One skilled in the art recognizes that implementation specific features may be added to the present invention to deny or convey information to recipients of transmissions that the originator has designated certain documents with confirmational acknowledgements. Optionally, a confirmational acknowledgment may be directed to a third party user. It should also be apparent that the present invention permits post confirmational specifications such that requests for COD notification may occur after distribution of objects. Finally, it should be apparent that the present invention allows a user to establish confirmational relationships among distributions as well as repository documents.

What is claimed is:

1. A computer implemented method of notifying an originator of a distribution having a plurality of isochronous objects therein when a predefined duration of time has elapsed during which said isochronous objects are accessed by a recipient in a data processing system, comprising:

creating a distribution having a plurality of isochronous objects by an originator in said data processing system;

specifying an access relationship between each of said plurality of isochronous objects by said originator and transmitting said distribution containing said access relationship to said recipient in said data processing system; and monitoring access of said plurality of isochronous objects by said recipient based on said access relationship transmitting a confirmation notice to said originator when said predefined duration of time is satisfied.

2. The method of claim 1 wherein said specifying step includes specifying in said access relationship a selected one of said plurality of isochronous objects contained in a previously delivered distribution to said recipient.

3. The method of claim 1 wherein said specifying step includes specifying in said access relationship a time range for accessing each of said plurality of isochronous objects.

4. A method of claim 1 wherein said creating step includes generating a confirmational relational identifier to signify which objects must be accessed for a confirmation of delivery notice to be generated.

5. A method of claim 1 wherein said monitoring step includes registering with a time service monitor the duration of access time spent in a specified object.

6. The method of claim 1 wherein said creating step includes designating a distribution identifier for said distribution.

7. The method of claim 6 wherein said monitoring step includes using said distribution identifier and object identifiers to correlate the relationships and confirmation of delivery notice.

8. An apparatus for transmitting a confirmational notification to an originator of a message when a recipient has maintained access to the message for a predefined period of time duration of access for the message in a data processing system, comprising:

means for providing a distribution for said originator containing said message within said data processing system;

means for specifying an access relationship between a plurality of objects within said message including isochronous and non-isochronous objects and indicating a request for the confirmational notification when the message is accessed by said recipient for the predefined time duration;

means for transmitting said distribution and said access relationship to said recipient; and means for monitoring said distribution when accessed by said recipient and tracking said time duration of access based upon said access relationship and generating said confirmational notification when said time duration is met.

9. An apparatus for transmitting a confirmational notification as claimed in claim 8, wherein said means for providing includes means for generating a distribution identifier for identifying said distribution.

10. An apparatus for transmitting a confirmational notification as claimed in claim 8, wherein said means for specifying an access relationship between a plurality of objects within said message includes means for specifying a time range for each of said objects within said message.

11. An apparatus for transmitting a confirmational notification as claimed in claim 8, wherein said means for specifying includes means for creating a completion set having all events required to generate said confirmational notification.

12. An apparatus for transmitting a confirmational notification as claimed in claim 8, wherein said means for monitoring includes means for detecting the time duration of each of said plurality of objects within said message.

* * * * *